Oct. 11, 1932.   T. M. INGMAN ET AL   1,881,612
FILM DEVELOPING SYSTEM
Filed Oct. 18, 1930   5 Sheets-Sheet 3
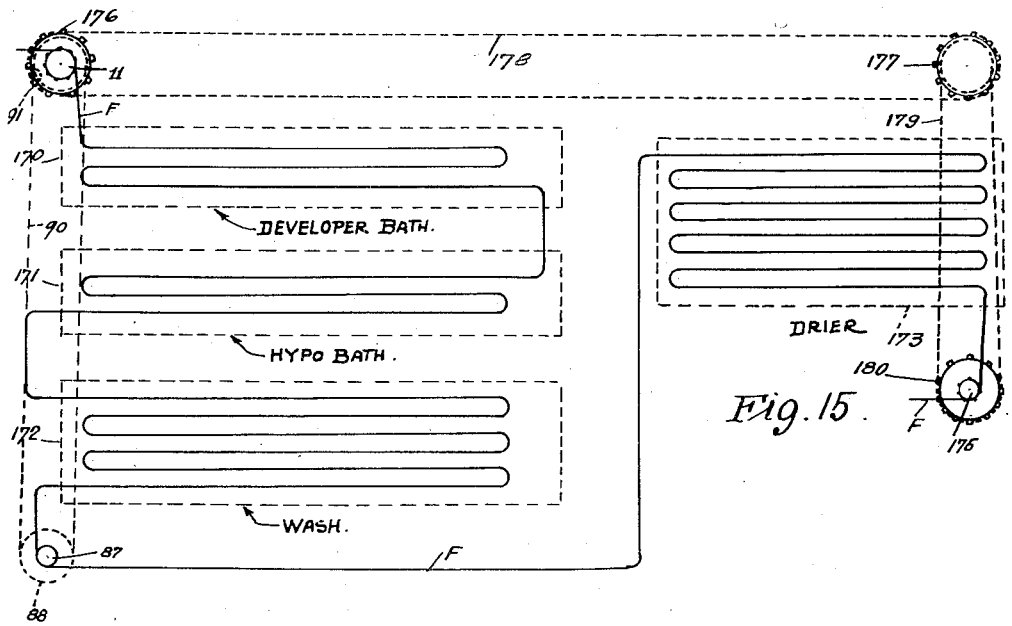
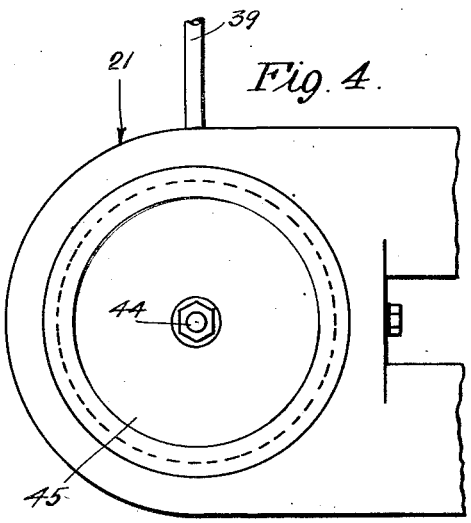
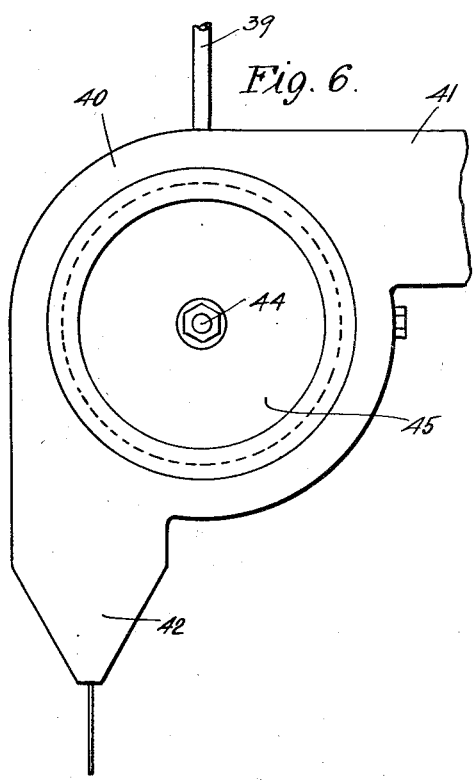
Inventors.
Thomas. M. Ingman.
Frank. E. Garbutt.
James. T. Barkelew.
Attorney.

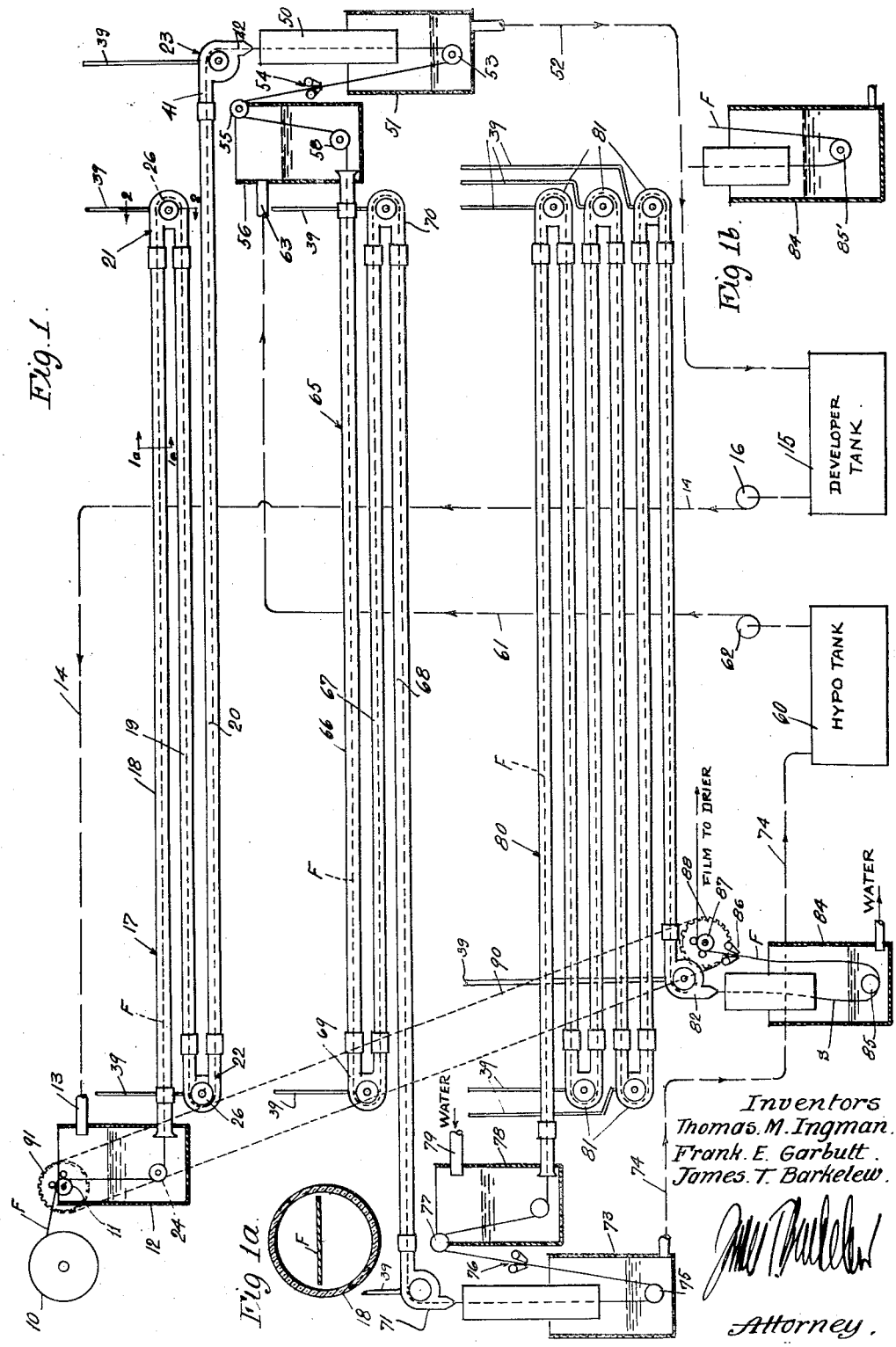

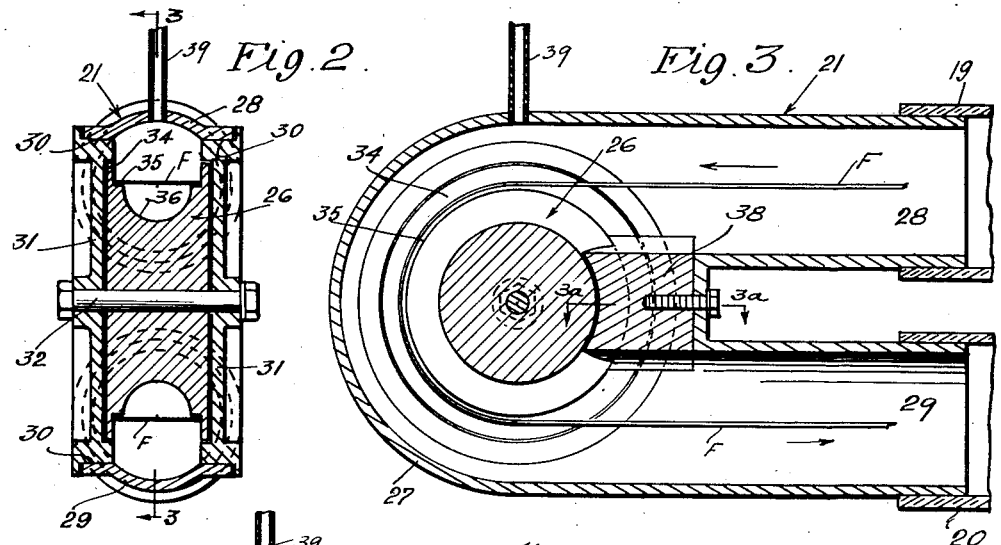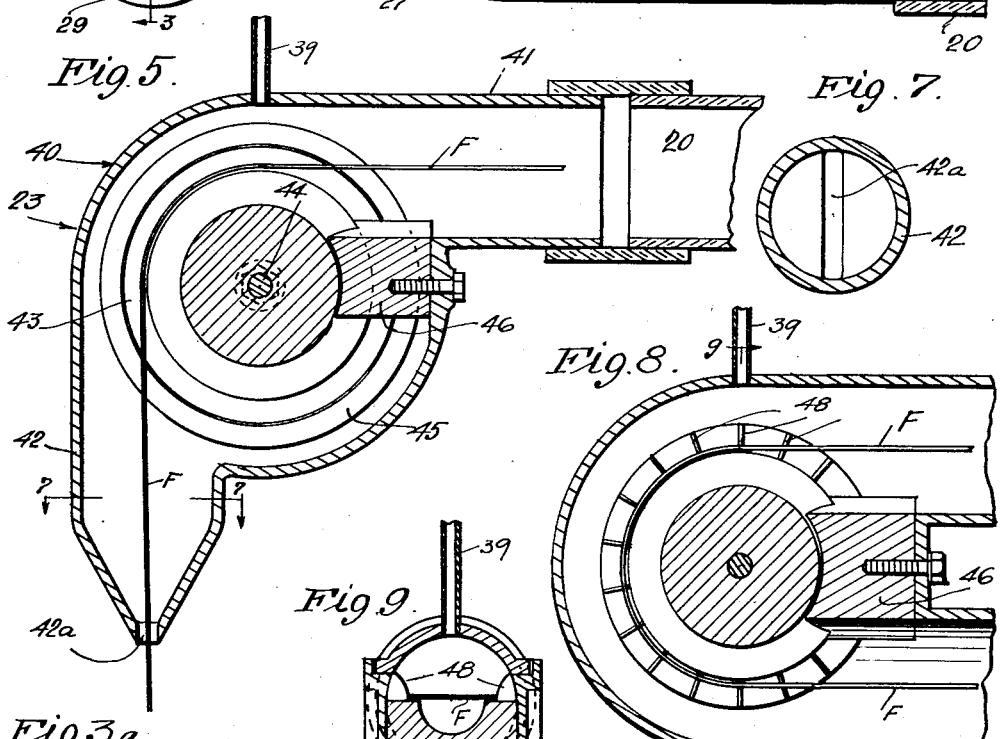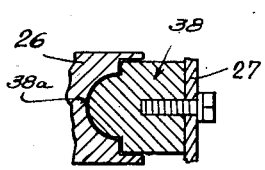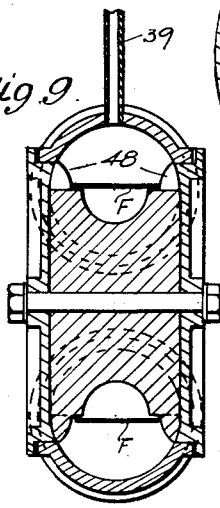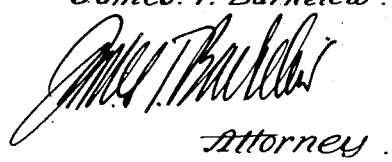

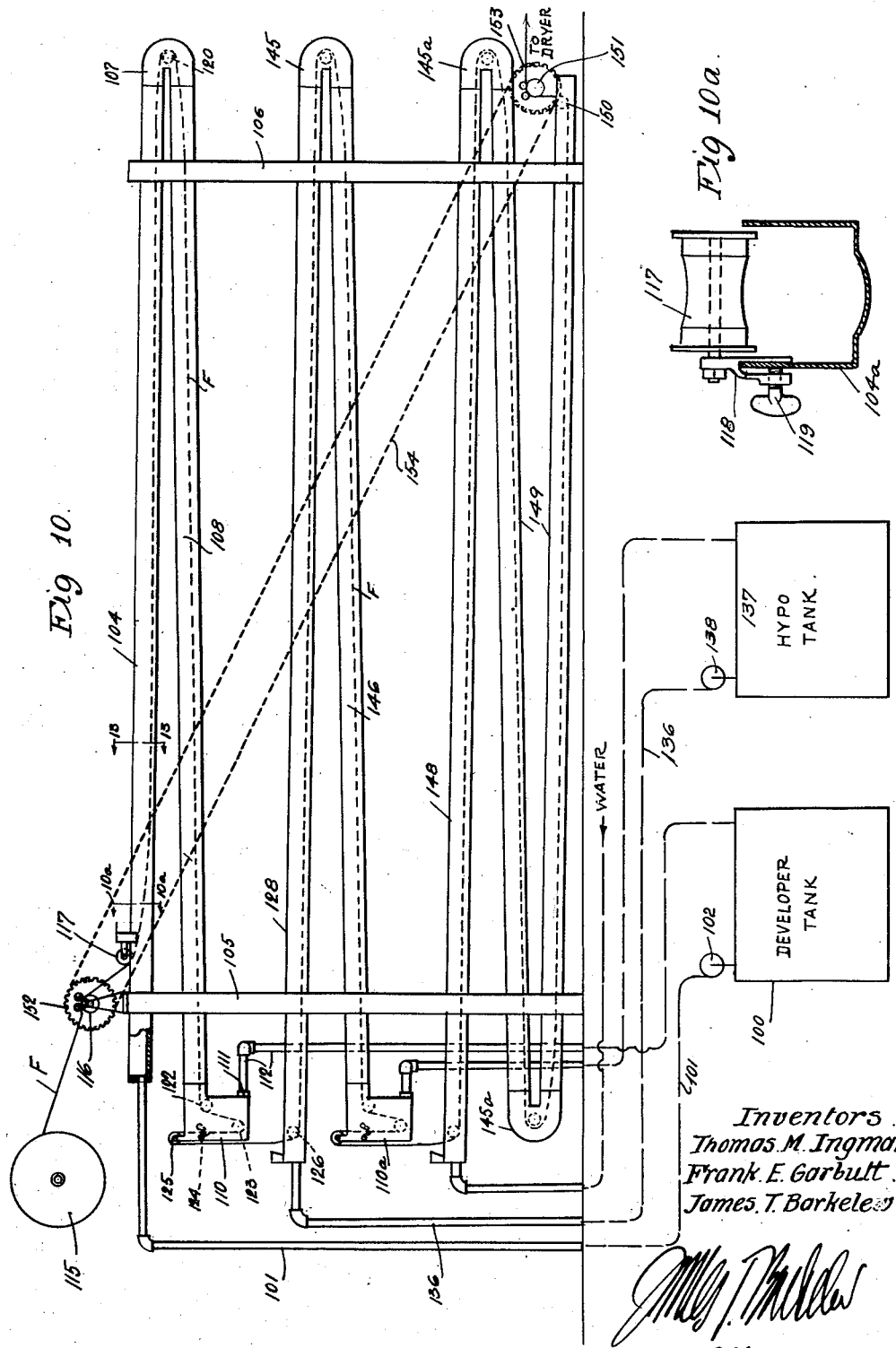

Oct. 11, 1932.   T. M. INGMAN ET AL   1,881,612
FILM DEVELOPING SYSTEM
Filed Oct. 18, 1930   5 Sheets-Sheet 5
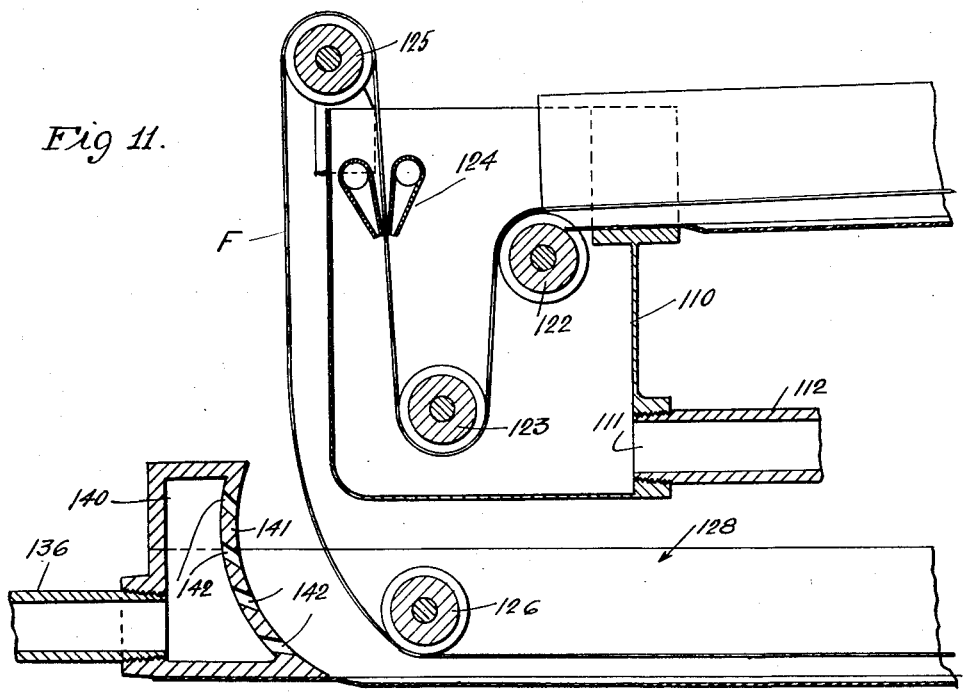
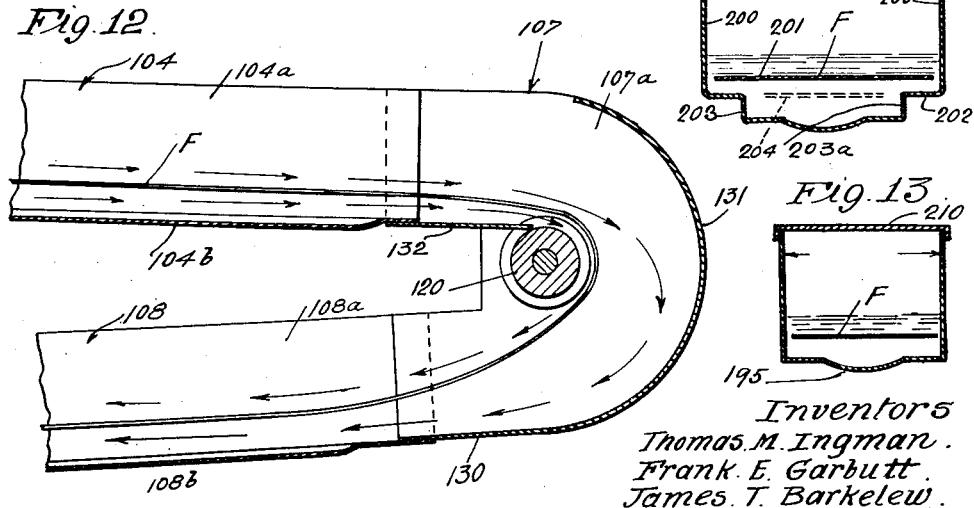
Inventors
Thomas M. Ingman.
Frank E. Garbutt.
James T. Barkelew.
Attorney.

UNITED STATES PATENT OFFICE

THOMAS M. INGMAN AND FRANK E. GARBUTT, OF LOS ANGELES, AND JAMES T. BARKE-LEW, OF PASADENA, CALIFORNIA, ASSIGNORS TO PARAMOUNT PUBLIX CORPORATION, OF NEW YORK, N. Y., A CORPORATION OF NEW YORK

FILM DEVELOPING SYSTEM

Application filed October 18, 1930. Serial No. 489,600.

This invention has general reference to the art of propelling long strips, such as motion picture film, through liquid baths. The present invention is designed particularly to meet in a simple but most effective manner the numerous problems encountered in developing, fixing, washing and drying motion picture film, and is therefore spoken of hereinafter particularly in that connection, but it will be understood the invention is also applicable to propulsion of film or other strips through other baths and treating apparatus as well.

In developing motion picture film, the film strip is ordinarily run in succession through the developing solution, the fixing bath, the water wash and finally the dryer, the film strip being continuously supplied to the developer bath and being delivered continuously from the dryer. Parts of the same film strip are thus in the wet bath while other parts are passing through the dryer. The principal difficulty heretofore encountered in propelling the film through such baths has arisen from the expansion of the film as it becomes wet and the shrinkage of the film as it dries. Since one part of the film strip may be undergoing wet treatment, and therefore be expanded, while another part of the film may be undergoing drying, and therefore be shrinkage, both elongation and shrinkage must be contended with in the same film strip. The difficulty ensuing from these conditions, and the attempts which have been made to obviate them, will be briefly referred to.

Perhaps the simplest method of propelling a film through the various baths is simply to drag it through from the outgoing end. But in order to achieve sufficiently large capacity in a single machine of reasonable size, the film must be drawn through the various baths in convolutions of some kind, and when this is done it is necessary to expend a considerable amount of energy on the film to move it. This energy is all supplied to the film by pull on its outgoing end, and when the film is pulled with sufficient force to supply energy sufficient to move it, it is apt to be permanently elongated, particularly in those parts where it is wet and soft.

Therefore it has been considered a better plan to apply propulsive force to the film at a number of points throughout its length. This has been attempted with the use of a number of driving sprockets. Driving sprockets are recognized to be unsatisfactory, however, because of their tendency to tear or deform sprocket holes in the wet parts of the film. Smooth driving rollers, often overdriven, have been employed in place of sprockets, but the expansion and shrinkage of the film, among other factors, then enter to complicate the problem. For instance, when no counter provisions are made, the expansion of the film in the wet end of the machine causes looseness which permits the smooth rollers to slip on the film, and the shrinkage in the dry end causes the film to bind on the rollers. Furthermore, the use of over driven frictions in any previously proposed form tends to put a cumulative strain on the film, which in many cases cannot be accurately controlled within safe limits.

It is a primary object of the present invention to provide a method of and means for propelling a film strip through the various baths in a most simple manner and without encountering any of the various difficulties found in processes heretofore practiced.

According to the present invention, speaking generally, the film is propelled through the several baths by force arising from the flow of the bath liquid through the bath containers. This is accomplished, in one form of the invention, by flowing the several treating liquids continuously through their respective containers and causing the film to be dragged therethrough by the force arising from the skin friction of the flowing treating liquids on the film.

The invention will be better understood from the following detailed description, reference for this purpose being had to the accompanying drawings, in which:

Figure 1 is a diagrammatic view of one specific form of apparatus arranged to carry out the present invention;

Fig. 1a is an enlarged section taken on line 1a—1a of Fig. 1;

Fig. 1b is a fragmentary view showing the last receiving tank 84 of the system of Fig. 1, but showing a weighted roller adapted to take up the slack in the film in said tank;

Fig. 2 is a vertical cross section of one of the U's utilized to connect successive pipe lengths in the apparatus shown in Fig. 1, this view being a section taken on line 2—2 of Fig. 1;

Fig. 3 is a vertical medial section taken on line 3—3 of Fig. 2.

Fig. 3a is a section taken on line 3a—3a of Fig. 3;

Fig. 4 is a fragmentary side elevation of the U;

Fig. 5 is a vertical medial section of one of the discharge nozzles shown in Fig. 1;

Fig. 6 is a side elevation of the same;

Fig. 7 is a cross section taken on line 7—7 of Fig. 5;

Fig. 8 is a section similar to Fig. 3 but showing a variational embodiment of the roller;

Fig. 9 is a section taken on line 9—9 of Fig. 8;

Fig. 10 is a view showing a variational embodiment of the apparatus;

Fig. 10a is a section taken on line 10a—10a of Fig. 10;

Fig. 11 is an enlarged medial section of a portion of the apparatus shown in Fig. 10 and showing in detail the means for taking the film from one bath in one set of conduits to another both in the succeeding set of conduits.

Fig. 12 is an enlarged fragmentary vertical medial section of the trough of Fig. 10 showing one of the U turns therein;

Fig. 13 is a cross section taken on line 13—13 of Fig. 10;

Fig. 14 is a view similar to Fig. 13 but showing a variational embodiment adapted for both a wide and a narrow film; and Fig. 15 is a diagrammatic layout of the entire system including the developer bath, hypo bath, wash and dryer.

Before proceeding to a detailed description of present forms of specific apparatus, it is to be emphasized that the apparatus herein shown is merely for illustrative purposes and is not to be considered as limitative on the broad invention, as the invention, considered in its broader aspects, is capable of being practiced in many forms of apparatus.

Referring now to the drawings, and more particularly to Fig. 1, we indicate at 10 a supply reel of motion picture film, and at 11 a feed sprocket adapted to take film from reel 10 and feed it to a tank 12. Tank 12 has in its upper end an inlet 13 to which is connected a supply pipe 14 that leads from the developer tank 15, a pump 16 being provided in pipe line 14 to flow the developer to tank 12. Leading from the lower end of tank 12 is a conduit 17, here shown as in the form of a convoluted pipe line or tubing.

In the present instance conduit 17 is made up of three substantially horizontal, parallel tubes or pipe lengths 18, 19 and 20, respectively, arranged successively one below the other and connected end to end by U couplings 21 and 22, as shown in Fig. 1, and having a downwardly directed discharge nozzle 23 on the discharge end of the last pipe 20. These conduit convolutions form collectively the developer chamber or container, in the form of a conduit. The convoluted arrangement is used to minimize the length of the machine for a given length of conduit; it will be understood from what follows that this and the other conduits could be arranged in a straight line if desired. Generally speaking, the tubes are made of a material that is chemically inert as regards the developer or other solution to be used in the process. The tubes here shown are formed of glass, which also has the property of rendering the film visible. Other materials such as bakelite, or a suitable metal as "resistal" may be used, however. The film is threaded from sprocket 11 under roller 24 mounted in tank 12 and from there through pipes 18, 19, and 20 in succession, passing from pipe to pipe through the U couplings 21 and 22, and finally leaving pipe 20 by way of discharge nozzle 23, the film being propelled through this path by the force arising from the skin friction of the liquid flowing through the pipes.

Each U coupling, one of which is shown in detail in Figs. 2, 3 and 4, preferably carries a roller 26 around which the film runs in passing from one pipe to the next. These couplings are each made up of a body 27 having legs 28 and 29 to which the proper pipe lengths are coupled, and having side openings 30 for removable side plates 31 that carry a transverse shaft 32 on which the previously mentioned film roller 26 is mounted. Film roller 26 is shown provided with flanges 34 and film treads 35, between which the roller surface is undercut to clear the film, as at 36. During operation, liquid from the pipe connected to leg 28 flows around the outer side of the roller and out leg 29 to the next pipe length. To prevent the liquid from flowing around the inner side of the roller, an abutment 38 having an inner surface 38a conforming to the contour of roller 26, is secured within body 27 at the inner side of the roller between legs 28 and 29, as clearly shown in Figs. 3 and 3a of the drawings.

To provide for the escape of air from the conduit so that it may be full of liquid, each U coupling and discharge nozzle is preferably provided at its upper side with a vent tube 39, the upper end of which is at least as high as the liquid height in the corresponding feed tank. For instance, the tubes 39 of couplings 21 and 22 and nozzle 23 of the developer unit will be as high as the liquid in feed tank 12, while the couplings 69 and 70 and nozzle 71 of the hypo unit will be as high as the liquid in feed tank 56, and so on, so that the liquid level in said vent tubes can rise to the level of the hydraulic gradient without spilling over.

The nozzle 23 through which the film and liquid are discharged from pipe 20 is shown in detail in Figs. 5, 6 and 7. The nozzle is similar in some respects to the U described above, having a body 40 provided with entering and discharge legs 41 and 42, respectively, said legs, however, being in the present instance at right angles to one another, the first being horizontal to connect with pipe 20, and the last being directed downwardly. Body 40 has between legs 40 and 41 a film roller 43 similar to roller 26, said roller being mounted on a transverse shaft 44 carried by side plates 45. The film from pipe 20 enters leg 40, passes around roller 45, and is carried downwardly out of the discharge leg 42, body 40 preferably being provided with an abutment 46 which prevents liquid from flowing inside of roller 43. The lower end of tube 42 is preferably restricted to a relatively narrow rectangular opening 42a which causes the liquid to be discharged in a flat stream about the film, this provision tending to cause the discharged liquid to increase in velocity as well as to adhere clearly to the film and thereby to exert a considerable additional localized pull thereon.

From leg 42 the film and developer solution are discharged through a vertical confining conduit 50, whose function is merely to prevent splash, into a receiving tank 51, from which the developer is conducted by a pipe line 52 back to the supply tank 15. The film passes from the lower end of conduit 50 under a roller 53 in tank 51 and then up through a squeegee 54 to a roller 55 at the top of a tank 56, which is similar to the original feed tank 12. The film rising from roller 53 in the receiving tank 51 is cleaned of developer by squeegee 54 and then passes over roller 55 to enter tank 56, which is supplied with hypo, as hereinafter to be described. From tank 56 the film is continuously taken by the flow of hypo through a hypo conduit 65, similar to the above described developer conduit, and from there is taken through a wash 80 also of similar characteristics. From the wash the film is taken immediately to the dryer, the film running continuously through these several units in succession.

Before proceeding to a more detailed description of the hypo and wash units, however, the operation of the developer unit will be more fully considered.

In operation, the developer is pumped from tank 15 through pipe line 14 to tank 12, and from the lower end of tank 12 flows, by virtue of the hydrostatic head in said tank, and, or, the drop in elevation in the conduit, successively through pipe lengths 18, 19 and 20 to discharge from nozzle 42 into tank 51, the developer finally being returned to the developer tank through pipe line 52. The flowing liquid in the pipe lengths 18, 19 and 20 advances the film by the force of skin friction, drawing it from feed sprocket 11 under roller 24 into the first pipe length 18, and thence through the several pipe lengths in succession to be finally discharged downwardly into tank 51. In initially threading the film, it is found convenient to attach a floater, such as a small block of wood, to the end of the film, before starting it through the conduit, this floater having the effect of leading the film through easily and without doubling up as sometimes occurs when the film is threaded without this aid.

The pull on the film through the conduit is due to the frictional drag of the flowing liquid, and is dependent in amount upon the velocity of flow of the liquid. This velocity of flow is, of course, dependent upon the hydrostatic head of liquid on the ingoing end of the conduit, and also upon the difference in elevation between the ingoing and outgoing ends of the conduit. The conduit may, of course, be horizontal, being in the form of a pipe, and the hydrostatic head in tank 12 depended upon alone. On the other hand it is convenient, if for no other reason than drainage of the conduit, to have it slope from end to end. And by increasing the slope to the proper degree velocity head generated in the sloping conduit alone may be used. Thus although the pipe lengths making up the conduit in Fig. 1 are substantially horizontal, they may be inclined to increase this difference in elevation, as in the embodiment of Fig. 10, thereby increasing the velocity of flow and gaining the advantages mentioned. These various head and velocity factors are so calculated that the resultant velocity of liquid flow will drag the film through at the speed desired, or preferably, will tend to drag the film through just a little faster than the speed permitted by the feed sprocket at the beginning end of the conduit, thus giving the conditions of frictional overdrive. The feed sprocket 11 thus acts as a hold back, the liquid being flowed through the conduit with sufficient velocity to provide a small amount of frictional overdrive so that the film will be kept moving in taut condition but will not be pulled against the rollers at the turns of the conduit and will not be too strongly pulled against the hold back sprocket.

In the present case the conduit is maintained full of liquid, and the film floats therein entirely clear of the walls of the conduit. A peculiar action of the flowing stream is to keep the film centered in the tube; however, with a round tube if the film touches it at all it can only touch at its edges (See Fig. 1a). And in passing through the several U couplings and the discharge nozzle, for the same reason the film floats around the rollers out of actual contact with their film treads, and also out of contact with the walls of the U couplings. The rollers 26 tend to rotate with the liquid flow so that the peripheral speed of the film treads is near that of the speed of the film, and if in any instance the film does touch the film treads it will therefore not rub thereon. To insure further that the rollers will rotate properly with the flowing liquid, their flanges 34 may be replaced by blades 48 (see Figs. 8 and 9), through which the rollers will be driven by the liquid. This arrangement also facilitates threading of the film through the U couplings as will be obvious.

It is found in practice that the film may thus be dragged by the flowing liquid at any desired speed through any length of conduit desired without developing excess pull on the film, and that when the conduit is convoluted the film will be carried around sharp turns without coming into contact with the walls either of the conduit or the U couplings. At the outgoing end of the conduit, however, it is preferable to provide a means for exerting an excess localized pull on the film as it is discharged so that it will be kept taut in leaving the conduit. It is for this reason that the vertical run of film between the discharge nozzle 23 and receiving tank 51 is provided, the liquid discharged from the nozzle at higher velocity acting on the film through this additional length to insure its being pulled through the nozzle. And to increase this effect the lower end of the nozzle is preferably restricted to the flat opening 42a to cause the liquid stream to be confined closely about the film and to have additional velocity.

In rising from tank 51 the film finally leaves the developer, the film being cleaned of the developer by squeegee 54 before entering tank 56. Hypo from a supply tank 60 is pumped through a pipe line 61 by a pump 62 therein to an inlet 63 in the upper end of the tank 56. Leading from the lower end of tank 56 is a conduit 65 made up of successive pipe lengths 66, 67 and 68 connected by U couplings 69 and 70 and having a final discharge nozzle 71, said couplings and discharge nozzle being similar to those illustrated in Figs. 2 to 9. The film is threaded from roller 55 under a roller 58 in the lower end of tank 56, and thence through the conduit 65.

The arrangement for discharging the hypo and film from nozzle 71 at the end of conduit 65, removing the film from the hypo and delivering it to the next unit, is similar to that utilized between the developer and hypo units. Thus, the film and hypo are discharged downwardly into a tank 73 from which the hypo is taken back to tank 60 by a pipe line 74, while the film passes under a roller 75 and then rises through a squeegee 76 to a roller 77 at the top of a tank 78.

This tank 78 is supplied through an inlet 79 at its upper end with the wash water, while leading from the lower end of tank 78 is a conduit 80 made up of a plurality of pipe lengths connected by U-couplings 81, through which the film is threaded, the conduit again having a discharge nozzle 82 at its outgoing end, all similar to the construction previously described for the developer and hypo units. Ordinarily, however, the wash conduit is roughly twice the length of the developer or hypo conduits.

The film is removed from conduit 80 and separated from the wash water similarly to the manner described for the developer and hypo units, the water dropping into a tank 84 and being withdrawn from the lower end thereof, and the film passing under a roller 85 in tank 84 and thence rising through a squeegee 86 to a take out sprocket 87. This sprocket 87 is here shown driven by a positive drive from feed sprocket 11, for instance a sprocket 88 connected by a chain 90 to a sprocket 91 that drives the original feed or hold back sprocket 11. Thus the take out sprocket 87 is driven together with the feed or hold back sprocket 11. However, while we have here shown the take out in the preferred form of a sprocket, any other form of constant take out may, of course, be used.

By the arrangement shown there will be no slip at either the ingoing or outcoming ends and there will always be a constant length of film (a constant number of sprocket holes) in the machine. Of course, the wet film always tends to elongate, and such elongation will vary with various samples of film, but within such limits the length of film between the hold back and take-out sprockets is constant. In this case slack due to elongation will be moved forwardly through the machine and will tend to accumulate in the final receiving tank 84, as indicated at s. This is for the reason that the frictional overdrive of the flowing liquid on the film tends to move any slack forwardly, while the take out sprocket 87 removes the film only at a constant rate. It will be understood, however, that this accumulation of slack is, within certain limits of divergence, constant in amount and does not continue to grow once running conditions are established. If it is desired to take up this slack, the roller 85 may be replaced by a floating idler 85' (Fig. 1b), the weight of which will be sufficient to take up the slack but not to exert undesired tension on the film.

From the above it will be understood that the take out merely removes the film from the machine, and does not function to pull the film through. The take out fulfills another important function, however, in acting as a hold back on the film so that any apparatus beyond the developing machine cannot exert tension on the constant length of film between the feed sprocket and take out.

In Fig. 15 is diagrammatically indicated the developer, hypo and wash units, designated at 170, 171, and 172, respectively together with a drier unit 173, the film F passing from the hold-back sprocket 11 through the several units in succession, and being removed from the drier unit by a take-out sprocket 175. The film is taken out of the wash unit at the end of the developer by the sprocket 91, chain 90, sprocket 88 and film sprocket 87, as before. The hold-back sprocket 11 is shown having a sprocket 176 chained to a sprocket 177 by a chain 178, sprocket 177 being connected with a suitable sprocket having a chain 179 driving a sprocket 180 that drives the take-out sprocket at the outgoing end of the drier.

By this arrangement, regardless of the nature of the dryer, there is at all times a constant length of film in the liquid conduits and the dryer.

In Figs. 10 to 14 inclusive is shown a variational embodiment in which open troughs are used in place of the closed pipes of the above described form. In Fig. 10 the numeral 100 indicates the developer tank, from which leads a supply pipe 101 having therein a pump 102 and leading to the inlet end of a trough 104, which is uppermost of a series of troughs mounted on upright frame structures 105 and 106, and through which the film passes in succession. The liquid is pumped to first trough 104 preferably with an initial velocity head to augment the flow velocity caused by trough inclination. Trough 104 inclines downwardly from its inlet end, and has at its lowermost end a U connection 107 (see Fig. 12) with a second trough 108. Trough 108 inclines downwardly from connection 107 the lower end of which has a liquid outlet 111 to which is connected a pipe 112 leading back to the developer tank.

The film F is taken from a supply reel 115 and threaded over a feed sprocket 116, here shown mounted on upright 105, and then passes under a positioning roller 117 to enter trough 104. Roller 117 is mounted on a hanger 118 clamped as by screw 119 to the side walls 104a of the trough (see Fig. 10a), the roller mounting being adjustable in position along the trough so that the film can be caused to enter the trough at any point desired. This provision becomes of importance when it is desired to adjust the length of time during which the film is in the developer solution without varying the rate of flow.

After thus entering trough 104 at the point determined by the position of roller 117, the film runs down said trough and around a roller 120 in U 107 to pass into and through trough 108. From the lower end of trough 108 the film passes over a roller 122 in tank 110, thence down and under a roller 123 in the lower end of the tank, thence rising through a squeegee 124 to a roller 125 at the upper edge of the tank, and thence around this roller and outside of the tank and down under a roller 126 in the next downwardly inclined trough 128.

The U connection 107 between troughs 104 and 108, shown more particularly in Fig. 12, includes side walls 107a connecting the side walls 104a and 108a of troughs 104 and 108, respectively, between which the aforesaid roller 120 is mounted, a bottom wall 130 connected to the bottom 108b of trough 108 and curving upwardly around the outer end of the U, as at 131, to provide a guide plate which will catch the liquid from trough 104 and turn it to flow into trough 108. Extending between side walls 107a and forming a continuation of bottom 104b of trough 104, is a wall 132 that terminates at roller 120 and causes the liquid to flow around the outside of said roller.

The film take-out provisions at the discharge end of trough 108 will be recognized to be similar to those of the embodiment previously described, their function being simply to remove the film from the developer solution and to clean it thereof before introducing it to the hypo unit below.

Hypo is supplied to trough 128 with an initial velocity head through a pipe line 136 leading from the hypo supply tank 137, a circulating pump 138 being provided in pipe line 136. Means are preferably provided for injecting the hypo solution into the trough with locally increased initial velocity. For this purpose the inlet end of trough 138 is here shown provided with a chamber 140 to which the hypo supply pipe is connected, said chamber having a curved front plate 141 adjacent the curved section of film entering the trough just ahead of roller 126. This curved plate 141 is provided with restricted fluid discharge openings 142 directed substantially tangentially to the curved film, so that the discharged fluid will act on the film to impart forward motion thereto.

From roller 126 the film is carried by the hypo down trough 128, around a U connection 145 (similar to that shown in Fig. 12) to a downwardly inclined trough 146, from there through a take-out tank 110a, similar to that above described, and in which the film is removed from the hypo solution, and thence into the next lower inclined trough 148.

Wash water is introduced to trough 148 through provisions similar to those described in connection with the hypo trough 128, the film being carried along by the wash water from troughs 148, through several successive inclined troughs 149 connected by U's 145a. The water is discharged from the end of the last wash trough, while the film is brought out around a roller 150 to a take-out sprocket 151. The feed or hold-back sprocket 116 and the take-out sprocket 151 are shown driven together through sprockets 152 and 153, respectively and a connecting chain 154.

In the last described form of apparatus the film floats nearly but not quite at the surface of the liquid (see Fig. 13) thus being covered on all sides by the solution and not rubbing on the bottom of the trough. Preferably, however, the bottom wall of the trough is curved downwardly opposite the emulsion area of the film, as at 195, so that should the film in any case rub on the bottom of the trough it will not be injured. The film is carried around the U-turns and rollers in the same manner as before described, free of the roller and of the U-walls.

One of the principal advantages of this trough form of apparatus is that the film is accessible at all points throughout the machine. If it is desired to enclose the troughs, they may be equipped with removable covers 210, as shown in Fig. 13. Another advantage resides in the fact that by adjustment of the position of roller 117 on trough 104 the length of film in the developer troughs 104 and 108 can be varied.

In Fig. 14 is shown a trough designed for either a narrow or a wide film, the side walls 200 of the trough being spaced sufficiently wide for a wide film 201, and the bottom 202 of the trough having a depression 203 whose side walls 203a are spaced for a narrow film 204. With such a trough either a wide or a narrow film, or both together, may be run.

Thus in both forms of apparatus, either tube or trough, the film strip is drawn in succession through the developer bath, the hypo bath and the wash, from which it may be taken through any suitable drier. And the flowing liquid constituting these baths is the medium from which the force is derived for so moving the film. In the first mentioned instance the bath containers through which the film is thus moved are in the form of closed conduits preferably of circular cross section, while in the second instance they are conduits in the form of open troughs, but it will be understood the containers may be of any suitable form through which the bath liquids may be flowed with sufficient velocity to provide force for driving the film. Also, it is to be understood that while in the present instance skin friction of the flowing liquids on the film is the source of the film propelling force, that in the broadest aspect any force arising from the flow of the bath liquids is contemplated within the scope of the invention. For instance, the rollers provided with blades (Figs. 8 and 9) tend to move the film by roller rotation, which in turn is caused by liquid flow.

In calculating the lengths of the conduits, the velocity of liquid flow, the elevational drop of the conduits, and so on, the following considerations are taken into account. The speed which must be given to the film depends, first, upon the time which is required in the developer, and second, upon the length of travel in the developer. For instance, suppose that the time of development is five minutes, and that the conduit is made up of three tube lengths of 20 feet each, giving a length of run in the developer of 60 feet. The velocity which must be given to the film is then 12 feet per minute, or, with three 50 feet tubes, giving a total conduit length of 150 feet, the velocity of the film must be 30 feet per minute. As another example, choosing 10 tubes each 60 feet in length, giving a total length of 600 feet, the velocity of the film will be 120 feet per minute or two feet per second.

Since, as is found in practice, no excessive pull is developed in this machine for long runs of film, the conduit can in fact be made of any length desired, and it is therefore possible to utilize any film speed desired. And it is found that the method of propulsion herein described is capable of handling film effectively at widely varying velocities.

Moreover, for any given length of conduit the time period of development can be varied by varying the speed of the film. In the tube form of the apparatus this, in fact, is the only method of regulating the time period of development, as the length of run is fixed. But in the open trough form the time period of development is also adjustable by regulation of the length of film in the troughs, as fully explained above.

The speed at which the film can be moved is governed, of course, by the velocity of liquid flow, and this in turn depends, first, upon the hydrostatic or velocity head on the ingoing end of the conduit, and second, upon the elevational drop of the conduit. In any given apparatus, however, the velocity may be varied by varying the hydrostatic or velocity head on the ingoing end of the conduit.

The invention herein disclosed is conceived of as being broad and fundamental, the specific apparatus illustrated and described being considered as merely illustrative of rather than limitative on the broad invention. It is to be understood, therefore, that all equivalent modes of practicing the invention are contemplated within the scope of the broader claims appended hereto.

We claim:

1. The method of treating a film strip, that comprises causing the film to be moved through a first conduit by virtue of skin friction on its surface of a first treating liquid continuously flowed through said conduit, and continuously taking the film as it leaves said first conduit and causing it thence to be moved through a second conduit by virtue of skin friction on its surface of a second treating liquid continuously flowed through said second conduit.

2. The method of treating a film strip, that comprises feeding the film to a conduit at a constant rate and causing it to be moved therein by virtue of skin friction on its surface of a treating liquid flowed through said conduit at a rate sufficient with respect to the rate of film feed to give conditions of frictional overdrive.

3. The method of treating a film strip, that comprises feeding the film to a conduit at a constant rate and causing it to be moved therein by virtue of skin friction on its surface of a treating liquid flowed through said conduit at a rate sufficient with respect to the rate of film feed to give conditions of frictional overdrive, and taking the film out of the outgoing end of the conduit at a constant rate.

4. The method of treating a film strip, that comprises feeding the film to a conduit at a constant rate and causing it to be moved therein by virtue of skin friction on its surface of a treating liquid flowed through said conduit at a rate sufficient with respect to the rate of film feed to give conditions of frictional overdrive, and sprocketing the film out of the outgoing end of the conduit at a constant rate.

5. The method of treating a film strip, that comprises feeding the film to a conduit at a constant rate and causing it to be moved therein by virtue of skin friction on its surface of a treating liquid flowed through said conduit, and taking the film out of the outgoing end of the conduit at a constant rate.

6. The method of treating a film strip, that comprises continuously feeding said film strip to the ingoing end of a first liquid conduit, continuously supplying a first treating liquid to the same end of said conduit, whereby the film is propelled in said conduit by skin friction of the flowing treating liquid on its surface, separating the first treating liquid from the film upon emergence from the first conduit, and thence leading the film to the ingoing end of a second liquid conduit, continuously supplying a second treating liquid to the same end of said second conduit, whereby the film is continuously pulled into and propelled through said second conduit by skin friction of the second treating liquid on its surface, separating the second treating liquid from the film upon emergence from said second conduit, and finally continuously taking out the film.

7. The method of developing, fixing and washing a motion picture film strip, that comprises continuously feeding said film strip to the ingoing end of a conduit of a given length, continuously flowing developer through said conduit so as to propel the film therethrough by the force of skin friction, controlling the velocity of film movement with respect to conduit length so that the film will be in the conduit a proper time for development, separating the developer from the film upon emergence from said conduit, and thence leading the film to the ingoing end of a second conduit, continuously flowing hypo through said second conduit so as to draw the film from the developer conduit and propel it through said second conduit, separating the hypo from the film upon emergence from the second conduit, and thence leading the film to the ingoing end of a third conduit, continuously flowing wash liquid through said third conduit so as to draw the film from the hpyo conduit and propel it through said third conduit, separating the wash liquid from the film upon emergence from said wash conduit, and finally continuously taking out the film.

8. The method of developing, fixing and washing a motion picture film strip, that comprises continuously feeding said film strip to the ingoing end of a conduit of a given length, continuously flowing developer solution through said conduit so as to propel the film therethrough by the force of skin friction, controlling the velocity of film movement with respect to conduit length so that the film will be in the conduit a proper time for development, separating the developer from the film upon emergence from said conduit, and thence leading the film to the ingoing end of a second conduit, continuously flowing hypo solution through said second conduit so as to draw the film from the developer conduit and propel it through said second conduit, separating the hypo solution from the film upon emergence from the second conduit, and thence leading the film to the ingoing end of a third conduit, continuously flowing wash liquid through said third conduit so as to draw the film from the hypo conduit and propel it through said third conduit, separating the wash liquid from the film upon emergence from said wash conduit, and finally continuously taking out the film at the same rate at which it is fed to the first conduit.

9. The method of developing, fixing and washing a motion picture film strip, that comprises continuously feeding said film strip to the ingoing end of a conduit of a given length, continuously flowing developer solution through said conduit so as to propel the film therethrough by the force of skin friction, controlling the rate of film fed to said conduit with respect to conduit length so that the film will be in the conduit a proper time for development, separating the developer from the film upon emergence from said conduit, and thence leading the film to the ingoing end of a second conduit, continuously flowing hypo solution through said second conduit so as to draw the film from the developer conduit and propel it through said second conduit, separating the hypo solution from the film upon emergence from the second conduit, and thence leading the film to the ingoing end of a third conduit, continuously flowing wash liquid through said third conduit so as to draw the film from the hypo conduit and propel it through said third conduit, separating the wash liquid from the film upon emergence from said wash conduit, and finally continuously taking out the film at the same rate at which it is fed to the first conduit.

10. The method of treating a film strip, that comprises continuously feeding said film strip to the ingoing end of a conduit of a given length, continuously flowing treating liquid through said conduit so as to propel the film therethrough by the force of skin friction, separating the treating liquid from the film upon emergence from the conduit, and controlling the rate of film feed to the conduit with respect to conduit length so that the film will be in the conduit a proper time for treatment.

11. The method of treating a film strip, that comprises continuously feeding said film strip at a given velocity to a conduit, continuously flowing treating liquid through said conduit so as to propel the film therethrough by the force of skin friction, separating the treating liquid from the film upon emergence from the conduit, and adjusting the length of film in the conduit at any one time so that any point on the film will be in the conduit a proper time period for treatment.

12. In film treating apparatus, an open conduit of given length through which a film may be propelled by skin friction of a liquid flowing therethrough, means for flowing liquid through said conduit, means for feeding a film, film guiding means taking said film from said film feeding means and guiding it into the flowing liquid in said conduit, and means for adjusting the position of said film guiding means whereby the film may be caused to enter the liquid in the conduit at any one of various points along the conduit.

13. In film treating apparatus, a conduit through which a film may be propelled by skin friction of a liquid flowing therethrough, means for feeding a film to one end of said conduit at a determined rate, and means for introducing liquid to the same end of said conduit at a head sufficient to cause liquid flow therethrough at a velocity with respect to the rate of film feed such as will cause frictional over drive of the film.

14. In film treating apparatus, a conduit through which a film may be propelled by skin friction of a liquid flowing therethrough, means for feeding a film to one end of said conduit at a determined rate, means for introducing liquid to the same end of said conduit to flow therethrough and propel the film, and means operating on the film after emergence from said conduit to move it at the same rate of speed as it is fed to the conduit.

15. In a film treating apparatus, a conduit through which a film may be propelled by skin friction of a liquid flowing therethrough, means for feeding a film to one end of said conduit at a determined rate, means for introducing liquid to the same end of said conduit to flow therethrough and propel the film, and means whereby a localized tension is exerted on the film as it leaves said conduit.

16. In film treating apparatus, a conduit through which a film may be propelled by skin friction of a liquid flowing therethrough, a film sprocket driven at a given rate for feeding film to one end of said conduit, means for introducing liquid to the same end of said conduit to flow therethrough and propel the film, and a film take out sprocket operating on the film after emergence from the conduit, said last sprocket driven at the same speed as the first mentioned sprocket.

17. In film treating apparatus, a conduit through which a film may be propelled by skin friction of a liquid flowing therethrough, a film sprocket for feeding film to one end of said conduit, means for introducing liquid to the same end of said conduit to flow therethrough and propel the film, a film take out sprocket operating on the film after emergence from the conduit, and means for driving both of said sprockets at the same rate of speed.

18. In film treating apparatus, a conduit through which a film may be propelled by skin friction of a liquid flowing therethrough, means for feeding a film to one end of said conduit at a determined rate, means for introducing liquid to the same end of said conduit to flow therethrough and propel the film, means whereby the liquid and film together are discharged downwardly from the outgoing end of the conduit through a vertical run, wherein the discharged liquid exerts an additional localized pull on the film, and means for thereafter separating the film from the liquid.

19. In film treating apparatus, a conduit through which a film may be propelled by skin friction of a liquid flowing therethrough, means for feeding a film to one end of said conduit, means for introducing liquid to the same end of said conduit to flow therethrough and propel the film, a receiving tank arranged, to receive the film and fluid discharge from the outgoing end of said conduit, means for withdrawing liquid from said tank, and means for taking the film out of said tank.

20. In film treating apparatus, a conduit through which a film may be propelled by skin friction of a liquid flowing therethrough, means for feeding a film to one end of said conduit, means for introducing liquid to the same end of said conduit to flow therethrough and propel the film, a receiving tank arranged to receive the film and fluid discharge from the outgoing end of said conduit, means for withdrawing liquid from said tank, a guide roller in said tank around which the film passes, and means for taking the film out of the tank from said guide roller.

21. In film treating apparatus, a conduit through which a film may be propelled by a liquid flowing therethrough, said conduit having a bend therein, and a film guide roller mounted in said bend, said roller having blades by which it is adapted to be rotated by the flowing liquid.

22. In film treating apparatus, a conduit through which a film may be propelled by a liquid flowing therethrough, and a fitting on the outgoing end of said conduit having a flat restricted opening through which the film and liquid are discharged, whereby the liquid is discharged in a flat stream of increased velocity closely confined about the film.

23. The method of treating a film strip, that comprises feeding the film to a conduit at a constant rate, causing the film to be moved through the conduit by virtue of skin friction on its surface of a treating fluid flowed through the conduit at a rate sufficient with respect to the rate of film feed to give conditions of frictional overdrive and resulting tension on the film, and removing the film from the outgoing end of the conduit at a rate that passes the same quantity of film in unit time as the feed at the ingoing end.

24. The method of treating a film strip which has equi-spaced sprocket holes, that comprises sprocketing the film to the ingoing end of a conduit at a certain rate of sprocket-holes per unit time, causing the film to be moved through the conduit by virtue of skin friction on its surface of a treating fluid flowed through the conduit at a rate sufficient with respect to the rate of film feed to give conditions of frictional overdrive and resulting tension on the film, and sprocketing the film from the outgoing end of the conduit at the same sprocket-holes-per-unit-time rate as at the ingoing end.

In witness that we claim the foregoing we have hereunto subscribed our names this 1st day of October 1930.

FRANK E. GARBUTT.
THOMAS M. INGMAN.
JAMES T. BARKELEW.